(12) United States Patent
Yiu

(10) Patent No.: US 9,913,180 B2
(45) Date of Patent: Mar. 6, 2018

(54) SYSTEMS, APPARATUSES, AND METHODS FOR MANAGING USER EQUIPMENT MOBILITY INFORMATION

(71) Applicant: Intel IP Corporation, Santa Clara, CA (US)

(72) Inventor: Candy Yiu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 499 days.

(21) Appl. No.: 14/569,295

(22) Filed: Dec. 12, 2014

(65) Prior Publication Data

US 2016/0173358 A1    Jun. 16, 2016

(51) Int. Cl.
| H04W 36/00 | (2009.01) |
| H04W 36/24 | (2009.01) |
| H04W 48/20 | (2009.01) |

(52) U.S. Cl.
CPC ...... *H04W 36/0083* (2013.01); *H04W 36/245* (2013.01); *H04W 48/20* (2013.01)

(58) Field of Classification Search
CPC ............. H04W 36/0083; H04W 48/20; H04W 36/245
See application file for complete search history.

(56) References Cited

U.S. PATENT DOCUMENTS

| 2009/0117905 A1* | 5/2009 | Watanabe ............. H04W 48/20 455/437 |
| 2009/0181676 A1* | 7/2009 | Lee ...................... H04J 11/0093 455/436 |
| 2010/0113019 A1 | 5/2010 | Jeong et al. |
| 2010/0272050 A1* | 10/2010 | Lim ........................ H04W 8/22 370/329 |
| 2013/0053065 A1 | 2/2013 | Xiao et al. |

(Continued)

FOREIGN PATENT DOCUMENTS

| WO | WO-2013055071 A2 | 4/2013 |
| WO | WO-2014025196 A1 | 2/2014 |
| WO | WO-2016094019 A1 | 6/2016 |

OTHER PUBLICATIONS

"International Application Serial No. PCT/US2015/060266, International Search Report dated Feb. 16, 2016", 3 pgs.

(Continued)

*Primary Examiner* — Joseph Dean, Jr.
(74) *Attorney, Agent, or Firm* — Schwegman Lundberg & Woessner, P.A.

(57) ABSTRACT

Disclosed herein are apparatuses, systems, and methods for creating and editing user equipment (UE) mobility information. During a radio resource control idle (RRC_IDLE) state, a plurality of cell reselections are logged into a mobility report, and each logged cell reselection includes a cell identification (Cell ID) and a Time of Stay (ToS) duration. The mobility report is edited to remove one or more logged cell reselections based, at least in part, on identifying logged cell reselections having duplicate Cell IDs and/or identifying logged cell reselections having a ToS duration lower than a threshold value. The edited mobility report is transmitted to an evolved Universal Terrestrial Radio Access Network (E-UTRAN) in response to the UE transitioning from the RRC_IDLE state to a radio resource control connected (RRC_CONNECTED) state.

21 Claims, 11 Drawing Sheets

(56) References Cited

U.S. PATENT DOCUMENTS

| | | | |
|---|---|---|---|
| 2013/0223403 A1* | 8/2013 | Chen ..................... | H04W 36/24 370/331 |
| 2014/0148171 A1 | 5/2014 | Cucala | |
| 2015/0017986 A1* | 1/2015 | Koskinen .......... | H04W 36/0083 455/436 |
| 2015/0045088 A1* | 2/2015 | Chen ..................... | H04W 36/10 455/525 |

OTHER PUBLICATIONS

"International Application Serial No. PCT/US2015/060266, Written Opinion dated Feb. 16, 2016", 5 pgs.

* cited by examiner

| CELL ID | TIME OF STAY (ms) |
|---|---|
| 101 | 3000 |
| 103 | 10000 |
| 105 | 800 |
| 103 | 15000 |
| 106 | 4000 |
| 108 | 53000 |
| 101 | 500 |
| 105 | 5000 |
| 110 | 50000 |
| 120 | 2500 |

FIG. 3

| CELL ID | TIME OF STAY (ms) |
|---|---|
| 301 — 101 | 3000 |
| 304 — 103 | 15000 |
| 305 — 106 | 4000 |
| 306 — 108 | 63000 |
| 308 — 105 | 5000 |
| 309 — 110 | 50000 |
| 310 — 120 | 2500 |

| CELL ID | TIME OF STAY (ms) |
|---|---|
| 301 — 101 | 3000 |
| 302 — 103 | 10000 |
| 303 — 105 | 800 |
| 304 — 103 | 15000 |
| 305 — 106 | 4000 |
| 306 — 108 | 53000 |
| 308 — 105 | 5000 |
| 309 — 110 | 50000 |

| CELL ID | TIME OF STAY (ms) |
|---|---|
| 101 | 3000 |
| 103 | 25000 |
| 106 | 4000 |
| 108 | 53000 |
| 101 | 500 |
| 105 | 5000 |
| 110 | 50000 |
| 120 | 2500 |

*FIG. 6A*

| CELL ID | TIME OF STAY (ms) |
|---|---|
| 301 — 101 | 3000 |
| 304 — 103 | 15000 |
| 305 — 106 | 4000 |
| 306 — 108 | 53000 |
| 307 — 101 | 500 |
| 308 — 105 | 5000 |
| 309 — 110 | 60000 |
| 310 — 120 | 2500 |

SYSTEMS, APPARATUSES, AND METHODS FOR MANAGING USER EQUIPMENT MOBILITY INFORMATION

TECHNICAL FIELD

Embodiments pertain to wireless communications. Some embodiments relate to user equipment (UE) mobility information.

BACKGROUND

In radio access technologies consistent with 3GPP Long Term Evolution ("LTE") Advanced Release 12 (March 2014) (the "LTE-A Standard"), an Enhanced Universal Terrestrial Radio Access Network (E-UTRAN) comprises one or more Evolved node Bs (eNodeBs), which are entities comprising one or more base stations, each managing traffic for one or more cells. A user equipment (UE) in a non-stationary mobility state can change cells to which it is communicatively coupled (i.e., a handover process). For handover processes, the UE and one or more eNodeBs can exchange information to avoid loss or duplication of transmitted data and to optimize the selection of cells.

BRIEF DESCRIPTION OF THE DRAWINGS

FIG. 3 is an illustration of mobility information for a user equipment (UE), according to an embodiment of the disclosure.

FIG. 4 is an illustration of edited mobility information for a UE, according to an embodiment of the disclosure.

FIG. 5 is an illustration of edited mobility information for a UE, according to an embodiment of the disclosure.

FIG. 6A and FIG. 6B are illustrations of mobility information for a UE edited in response to identifying ping-pong handovers, according to an embodiment of the disclosure.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that can receive and/or transmit information wirelessly. In some embodiments, the mobile device or other device can be a user equipment (UE) or an Evolved Node-B (eNodeB) configured to operate in accordance with 3GPP standards (e.g., the 3GPP Long Term Evolution ("LTE") Advanced Release 12 (March 2014) (the "LTE-A Standard")). In some embodiments, the mobile device or other device can be configured to operate according to other protocols or standards, including IEEE 802.11 or other IEEE and 3GPP standards. In some embodiments, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

Figure 1:
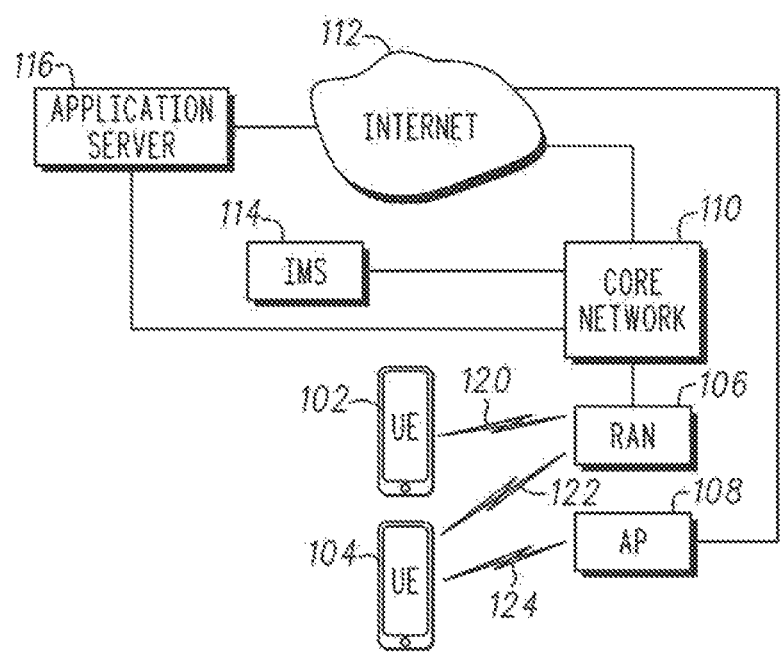
FIG. 1 illustrates an architecture of a wireless network with various components of the network, in accordance with some embodiments.

FIG. 1 illustrates an architecture of a wireless network with various components of the network, in accordance with some embodiments. A system 100 is shown to include a UE 102 and a UE 104. The UEs 102 and 104 are illustrated as smartphones (i.e., handheld touchscreen mobile computing devices connectable to one or more cellular networks), but can also include PDAs, pagers, laptop computers, desktop computers, and the like.

The UEs 102 and 104 are configured to access a radio access network (RAN) 106 via connections 120 and 122, respectively, each of which comprise a physical communications interface or layer; in this embodiment, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP LTE protocol, and the like.

The RAN 106 can include one or more access points that enable the connections 120 and 122. These access points (described in further detail below) can be referred to as access nodes, base stations (BSs), NodeBs, eNodeBs, and so forth, and can comprise ground stations (i.e., terrestrial access points) or satellite access points providing coverage within a geographic area (i.e., a cell). The RAN 106 is shown to be communicatively coupled to a core network 110. The core network 110 can be used to enable a packet-switched data exchange with the internet 112 in addition to bridging circuit switched calls between the UEs 102 and 104. In some embodiments, the RAN 106 can comprise an E-UTRAN), and the core network 110 can comprise an Evolved Packet Core (EPC) network.

The UE 104 is shown to be configured to access an access point (AP) 108 via connection 124. The connection 124 can comprise a local wireless connection, such as a connection consistent with IEEE 802.11, wherein the AP 108 would comprise a wireless fidelity (WiFi) router. In this example, the AP 108 is shown to be connected to the Internet 112 without connecting to a core network 110.

The Internet 112 is shown to be communicatively coupled to an application server 116. The application server 116 can be implemented as a plurality of structurally separate servers or can be included in a single server. The application server 116 is shown as connected to both the Internet 112 and the core network 110; in other embodiments, the core network 110 connects to the application server 116 via the Internet 112. The application server 116 can also be configured to support one or more communication services (e.g., Voice-over-Internet Protocol (VoIP) sessions, PTT sessions, group communication sessions, social networking services, etc.) for UEs that can connect to the application server 116 via the core network 110 and/or the Internet 112.

The core network 110 is further shown to be communicatively coupled to Internet Protocol (IP) Multimedia Subsystem (IMS) 114. The IMS 114 comprises an integrated network of telecommunications carriers that can enable the use of IP for packet communications, such as traditional telephony, fax, e-mail, internet access, VoIP, instant messaging (IM), videoconference sessions and video on demand (VoD), and the like.

Figure 2A:
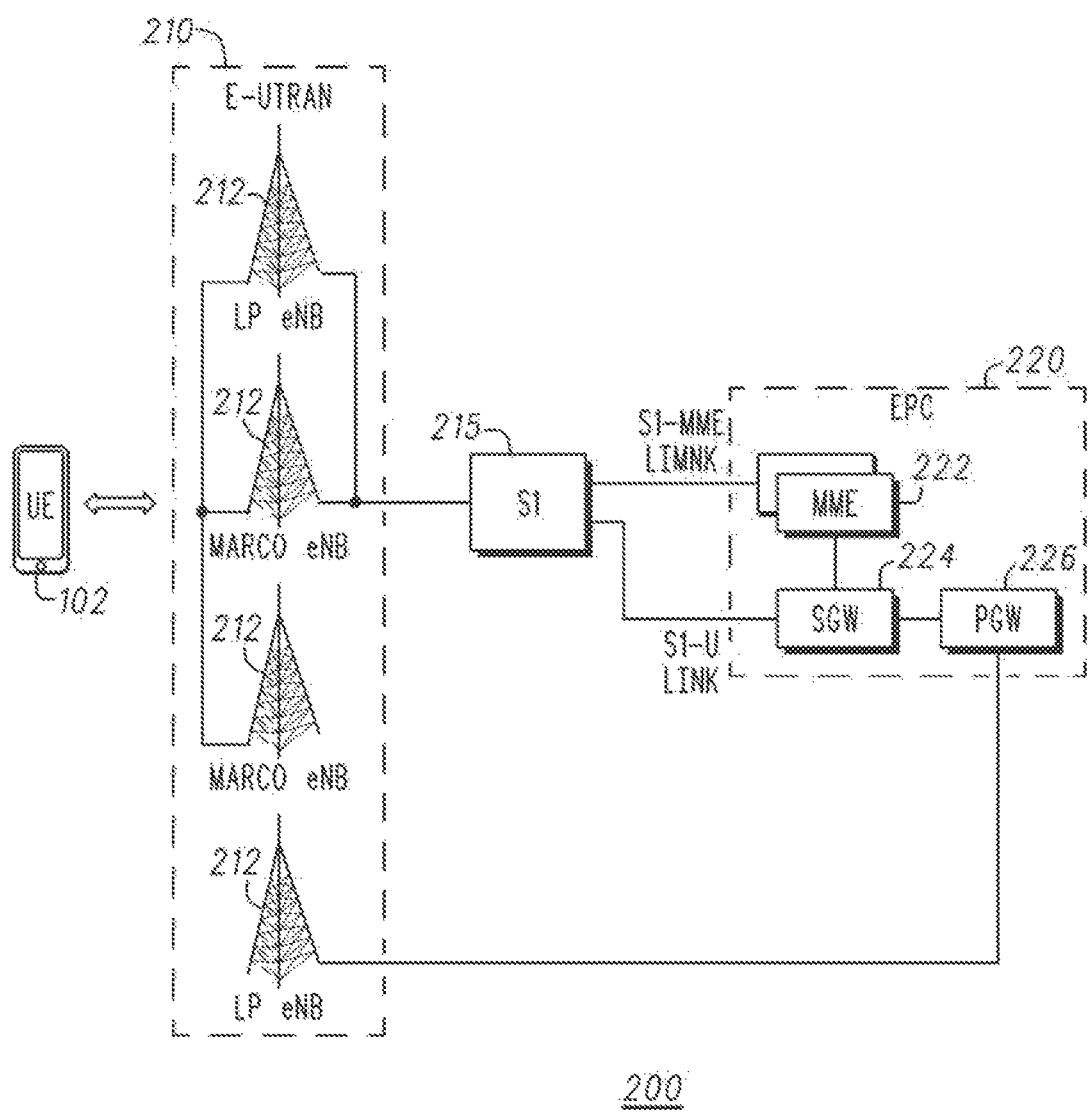
FIG. 2A illustrates an architecture of components of a 3GPP Long Term Evolution (LTE) network, in accordance with some embodiments.

FIG. 2A illustrates an architecture of components of an LTE network, in accordance with some embodiments. In this embodiment, (sub)system 200 comprises an Evolved Packet System (EPS) on an LTE network, and thus includes an E-UTRAN 210 and an EPC network 220 communicatively coupled via an S1 interface 215. In this illustration, only a portion of the components of E-UTRAN 210 and the EPC network 220 are shown. Some of the elements described below may be referred to as "modules" or "logic." As referred to herein, "modules" or "logic" may describe hardware (such as a circuit), software (such as a program driver) or a combination thereof (such as a programmed microprocessing unit).

The E-UTRAN 210 includes eNodeBs 212 (which can operate as base stations) for communicating with one or more UEs (e.g., the UE 102). The eNodeBs 212 are shown in this embodiment to include macro eNodeBs and low power (LP) eNodeBs. Any of the eNodeBs 212 can terminate the air interface protocol and can be the first point of contact for the UE 102. In some embodiments, any of the eNodeBs 212 can fulfill various logical functions for the E-UTRAN 210 including but not limited to radio network controller (RNC) functions such as radio bearer management, uplink and downlink dynamic radio resource management and data packet scheduling, and mobility management. eNodeBs in EPS/LTE networks, such as the eNodeBs 212, do not utilize a separate controller (i.e., an RNC) to communicate with the EPC network 220; in other embodiments utilizing other specification protocols, RANs can include an RNC to enable communication between BSs and core networks.

In accordance with embodiments, the UE 102 can be configured to communicate Orthogonal Frequency-Division Multiplexing (OFDM) communication signals with any of the eNodeBs 212 over a multicarrier communication channel in accordance with an Orthogonal Frequency-Division Multiple Access (OFDMA) communication technique for downlink communications, and a Single Carrier Frequency Division Multiple Access (SC-FDMA) communication technique for uplink communications. The OFDM signals can comprise a plurality of orthogonal subcarriers.

In accordance with some embodiments, the UE 102 can be configured to determine a synchronization reference time based on reception of one or more signals from any of the eNodeBs 212. The UE 102 can also be configured to support device-to-device (D2D) communication with other UEs using OFDMA, SC-FDMA, or other multiple access schemes.

The S1 interface 215 is the interface that separates the E-UTRAN 210 and the EPC network 220. It is split into two parts: the S1-U, which carries traffic data between the eNodeBs 212 and the serving gateway (SGW) 224, and the S1-MME, which is a signaling interface between the eNodeBs 212 and the mobility management entities (MMEs) 222. An X2 interface is the interface between eNodeBs 212. The X2 interface can comprise two parts (not shown): the X2-C and X2-U. The X2-C is the control plane interface between the eNodeBs 212, while the X2-U is the user plane interface between the eNodeBs 212.

With cellular networks, low power cells can be used to extend coverage to indoor areas where outdoor signals do not reach well, or to add network capacity in areas with very dense phone usage, such as train stations. As used herein, the term "LP eNodeB" refers to any suitable relatively low power eNodeB for implementing a narrower cell (i.e., narrower than a macro cell) such as a femtocell, a picocell, or a micro cell at the edge of the network. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNodeB might be a femtocell eNodeB since it is coupled through the packet data network gateway (PGW) 226. Similarly, a picocell is a wireless communication system typically covering a small area, such as in-building (offices, shopping malls, train stations, etc.) or, more recently, in-aircraft. A picocell eNodeB can generally connect through the X2 link to another eNodeB such as a macro eNodeB through its base station controller (BSC) functionality. Thus, a LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, this can be referred to as an AP BS or enterprise femtocell.

In some embodiments, a downlink resource grid can be used for downlink transmissions from any of the eNodeBs 212 to the UE 102, while uplink transmission from the UE 102 to any of the eNodeBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UE 102. The physical downlink control channel (PDCCH) carries information about the transport format and resource allocations related to the PDSCH channel, among other things. It also informs the UE 102 about the transport format, resource allocation, and H-ARQ (Hybrid Automatic Repeat Request) information related to the uplink shared channel. Typically, downlink scheduling (assigning control and shared channel resource blocks to the UE 102 within a cell) is performed at any of the eNodeBs 212 based on channel quality information fed back from the UE 102 to any of the eNodeBs 212, and then the downlink resource assignment information is sent to the UE 102 on the control channel (PDCCH) used for (assigned to) the UE.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The EPC network 220 includes the MMEs 222, the SGW 224, and a PGW 226. The MMEs 222 are similar in function to the control plane of legacy Serving General packet radio service (GPRS) Support Nodes (SGSN). The MMEs 222 manage mobility aspects in access such as gateway selection and tracking area list management. The SGW 224 terminates the interface toward the E-UTRAN 210, and routes data packets between the E-UTRAN 210 and the EPC network 220. In addition, it can be a local mobility anchor point for inter-eNodeB handovers and also can provide an anchor for inter-3GPP mobility. Other responsibilities can include lawful intercept, charging, and some policy enforcement.

The SGW 224 and the MMEs 222 can be implemented in one physical node or separate physical nodes. The PGW 226 terminates an SGi interface toward the packet data network (PDN). The PGW 226 routes data packets between the EPC network 220 and external networks (e.g., the internet), and can be a key node for policy enforcement and charging data collection. The PGW 226 and SGW 224 can be implemented in one physical node or separated physical nodes.

The UE 102 performs cell selection upon power-up and cell reselections throughout its operation. The UE 102 searches for a cell provided by E-UTRAN 210 (e.g., a macro cell or a pico cell). During the cell reselection process, the UE 102 can measure reference signal strength for each neighboring cell (e.g., Reference Signal Received Power/Reference Signal Received Quality (RSRP/RSRQ)) and select a cell based on this measurement (e.g., select a cell with the highest RSRP value). After the UE 102 selects a cell, it can verify the accessibility of the cell by reading the master information block (MIB). If the UE 102 fails to read the MIB of the selected cell, it can discard the selected cell and repeat the above process until a suitable cell is discovered.

A radio resource control (RRC) state indicates whether an RRC layer of the UE 102 is logically connected to an RRC layer of the E-UTRAN 210. After the UE 102 is communicatively coupled to a cell, its RRC state is RRC_IDLE. When the UE 102 has data packets to transmit or receive, its RRC state becomes RRC_CONNECTED. The UE 102, when in an RRC_IDLE state, can associate itself to different cells.

Figure 2B:
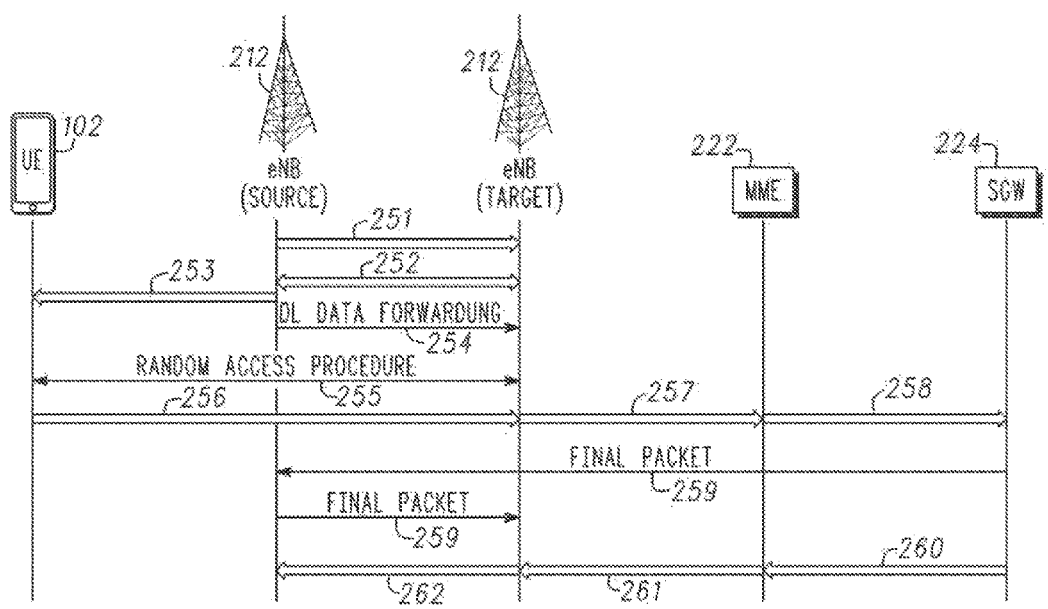
FIG. 2B illustrates a handover process, according to an embodiment of the disclosure.

FIG. 2B illustrates a handover process, according to an embodiment of the disclosure. Process 250 comprises an exemplary handover process for changing the connectivity of the UE 102 from a first eNodeB 212 (referred to hereinafter as the "source" eNodeB 212) and a second eNodeB 212 (referred to hereinafter as the "target" eNodeB 212). In this exemplary embodiment, the MME entity 222 and SGW entity 224 are the same throughout the handover process. In other examples, the MME and/or SGW entities may change.

In this embodiment, the source eNodeB 212 can determine, based on a measurement report, to execute a handover to the target eNodeB 212. The source eNodeB 212 can initiate a handover procedure by sending a HANDOVER REQUEST message 251 to the target eNodeB 212. The target eNodeB sends a HANDOVER REQUEST ACK message 252, including an RRCConnectionReconfiguration message 253 comprising the parameters of the new cell for the UE 102 (forwarded by the source eNodeB 212). The source eNodeB 212 forwards downlink data to the target eNodeB 212 via a downlink data forwarding process 254.

The UE 102 executes a random access procedure 255 in the new cell (provided by the target eNodeB 212) to get the Timing Advance and uplink grant. The UE 102 sends an RRCConnectionReconfigurationComplete message 256 as a handover confirmation to the target eNodeB 212. The target eNodeB issues PATH SWITCH REQUEST message 257 to the MME 222 to modify the downlink direction of data. The MME subsequently sends an update user plane message 258 to the SGW 224 to update the user plane.

The uplink and the downlink data starts in the target eNodeB 212. The target eNodeB has to buffer the uplink data until the data connection to the SGW 224 is switched. In this embodiment, a final packet 259 is shown to be received at the source eNodeB 212, and then forwarded to the target eNodeB 212.

The SGW 224 confirms the switch between eNodeBs by sending an update user plane response message 260 to the MME 222 to confirm the user plane update. The MME 222 subsequently confirms the switch to the target eNodeB 212 via a PATH SWITCH REQUEST ACKNOWLEDGE message 261 to acknowledge the path switch. As the target eNodeB is now serving the UE 102, it sends a UE CONTEXT RELEASE message 262 to the source eNodeB 212. The source eNodeB subsequently releases radio and C-plane related resources associated to the context for UE 102.

FIG. 3 is an illustration of mobility information for a UE, according to an embodiment of the disclosure. As discussed above, a UE may associate itself with various cells when in an RRC_IDLE state. The corresponding E-UTRAN is not aware of the UE's mobility during this state. When the UE transitions to an RRC_CONNECTED state, it can also send mobility information, indicating cells to which the UE was communicatively coupled (e.g., via cell identification (Cell ID) values), and its duration within said cell (e.g., via Time of Stay (ToS) values).

In this embodiment, an example of mobility information recorded (i.e., logged) by a UE is shown in a table 300, comprising entries 301-310 of cell reselections by the UE. In this example, a UE transitioned cells ten times during an RRC_IDLE state.

In some embodiments, the mobility information sent to the E-UTRAN is limited to a predetermined set of entries. For example, if mobility information transmitted to the E-UTRAN is limited to eight entries, some criteria can be used to eliminate information for some cell reselections. An example criterion is to log only the first eight cell reselections—i.e., log the entries 301-308 and omit the entries 309 and 310 (and thus, the entries 309 and 310 are not "included" in the table, as indicated by the dashed lines in FIG. 3).

In this example, omitting the entries 309 and 310 omits valuable information, because the UE was communicatively coupled to the cells for these entries (i.e., Cell IDs 110 and 120) for extensive periods of time compared to other entries. Moreover, the sequence 320 comprises a ping-pong handover sequence. A ping-pong handover can occur if a UE has very similar radio conditions towards two (or more) cells. The sequence 320 illustrates a handover from Cell ID 103 to Cell ID 105, and then back to Cell ID 103; in other words, the ToS duration value for the entry 303 indicates the UE was only briefly communicatively coupled to Cell ID 105. Ping-pong handovers may occur for a variety of reasons, such as a UE being at the edge of two cells and going through channel fading (further exasperated by slow mobility), the UE receiving multiple pilot signals from different cells having approximately the same strength, the UE moving back and forth between two cells too quickly, and so forth. The ToS duration value for the entry 303 is of little/no significance for informing the E-UTRAN of the mobility of the UE, and thus inclusion of the entry 303 at the expense of the entries 309 and 310 produces sub-optimal mobility information.

In some embodiments, mobility information is edited by removing one or more logged cell reselections other than cell reselections 309 and 310. The mobility information can be edited in response to the number of logged cell reselections exceeding a threshold value (e.g., eight entries, sixteen entries, etc.), or for any other reasons. The mobility information can be edited based, at least in part, on identifying one or more logged cell reselections having duplicate Cell IDs, identifying one or more logged cell reselections having a ToS duration lower than a threshold value, or any other criteria.

FIG. 4 is an illustration of edited mobility information for a UE, according to an embodiment of the disclosure. In this embodiment, a table 400 comprises an edited version of the table 300 in FIG. 3. In this embodiment, cell reselections having duplicate Cell IDs are identified; cell reselections for a Cell ID having the largest ToS duration are kept; and the remaining duplicate cell reselections for the Cell ID are removed. In this example embodiment, the table 400 comprises the entries of the table 300 of FIG. 3 with duplicate entries 302 (for Cell ID 103), 303 (for Cell ID 105), and 307 (for Cell ID 101) removed. In other words, the entries 304 (for Cell ID 103), 308 (for Cell ID 105), and 301 (for Cell ID 101) are kept in the table 400, as these entries correspond to cell reselections for a Cell ID having the largest ToS duration. As discussed above, instead of utilizing a criterion of logging only at most eight cell reselections, the entries 309 and 310 are included in the table 400, thereby producing more optimal mobility information compared to the table 300 of FIG. 3, as the UE was communicatively coupled to the cells for these entries (i.e., Cell IDs 110 and 120) for extensive periods of time compared to the removed entries.

FIG. 5 is an illustration of edited mobility information for a UE, according to an embodiment of the disclosure. In this embodiment, a table 500 comprises an edited version of the table 300 in FIG. 3. In this embodiment, cell reselections having ToS durations above a minimum value are kept, and the remaining cell reselections are removed. In this example, the minimum value comprises 600 ms, and thus the entry 307 of FIG. 3 (which comprises a ToS duration of 500 ms) is removed. A low ToS duration may be the result high mobility of the UE, stale cell quality information, erroneous signal measurements, and so forth. As discussed above, instead of utilizing a criterion of logging only at most eight cell reselections, the entry 309 is included in the table 500, thereby producing more optimal mobility information compared to the table 300 of FIG. 3.

In some embodiments, logged cell reselections associated with ping-pong handovers are edited from the mobility information logged by the UE. As discussed above, ping-pong sequences comprise logged cell reselections having both duplicate Cell IDs and logged cell reselections having a ToS duration lower than a threshold value. For example, the ping-pong sequence 320 of FIG. 3 comprises two logged cell reselections for cell ID 103 (i.e., the entries 302 and 304) and one logged cell reselection in between with a low ToS duration (i.e., the entry 303).

FIG. 6A and FIG. 6B are illustrations of mobility information for a UE edited in response to identifying ping-pong handovers, according to embodiments of the disclosure. In the example embodiment of FIG. 6A, a table 600 comprises an edited version of the table 300 in FIG. 3. In this embodiment, sequence 320 of the table 300 of FIG. 3 is identified as a ping-pong sequence, wherein the transition from Cell ID 103 to Cell ID 105 (corresponding to the entries 302-303) is identified as an unnecessary handover sequence; i.e., the entries for the sequence 320 do not convey information about the mobility of the UE.

In the example embodiment of FIG. 6A, the table 600 removes the entries 302-304 of the ping-pong sequence 320, and replaces the sequence with the entry 602. This entry comprises a ToS duration value of the entry 302 of FIG. 3 added with the ToS duration value of the entry 304 of FIG. 3. (i.e., the entry 602 comprises a ToS duration value 10000 ms+15000 ms). The effect of editing cell reselection data according to this example embodiment is that table 600 includes more accurate information about the duration of the cell reselection for Cell ID 103; i.e., the duration of the ToS is logged as if the ping-pong handover did not occur. Furthermore, as discussed above, instead of utilizing a criterion of logging only at most sixteen cell reselections, the entries 309 and 310 are included in the table 600, thereby producing more optimal mobility information compared to the table 300 of FIG. 3.

In the example embodiment of FIG. 6B, table 650 is illustrated such that, for the ping-pong sequence 320 of table 300 of FIG. 3, the entries 302 and 303 are removed. The entry 302 is removed, as the cell reselection of Cell ID 105 in ping-pong sequence 320 is treated as erroneous for the reasons discussed above. For the duplicate entries for cell ID 103, the entry having the highest ToS duration (i.e., the entry 304) is kept in the table 650, rather than the other entry (i.e., the entry 302). These entries are not combined (as they are in the example embodiment of FIG. 6A) in order to eliminate computation costs associated with adding ToS duration values. The entries 309 and 310 are also included in the table 650.

Figure 7:
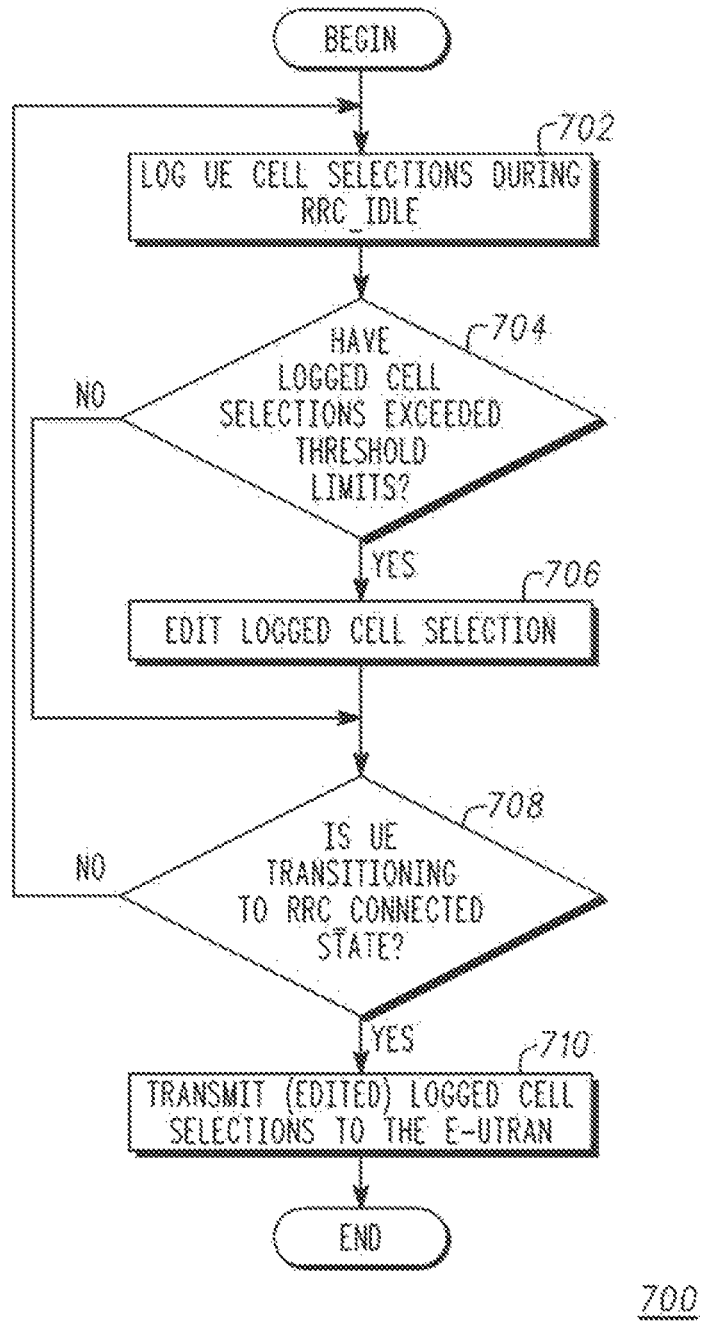
FIG. 7 is a flow diagram of a process for transitioning from logging and editing UE cell reselections, according to an embodiment of the disclosure.

FIG. 7 is a flow diagram of a process for transitioning from logging and editing UE cell reselections, according to an embodiment of the disclosure. Logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions can be performed in parallel. Additionally, one or more actions can be omitted in various embodiments; thus, not all actions are executed in every implementation. Other process flows are possible.

Process 700 includes executing an operation to log cell reselections of a UE during a RRC_IDLE state (shown as block 702). As described above, each logged cell reselection can include a Cell ID and a ToS duration value. Cell reselections can be logged in any kind of data structure or data format (e.g., a mobility report). In some embodiments, the number of cell reselections to be logged is limited to a pre-determined quantity (e.g., eight, sixteen, etc.). Thus, an operation is executed to determine if the logged cell reselections have exceeded a threshold value (shown as block 704). If they have, then an operation is executed to edit the logged cell reselections to bring the total amount of logged cell reselections under the threshold value (shown as block 706).

In some embodiments, logged cell reselections are edited such that for each of the duplicate Cell IDs, logged cell reselections for a Cell ID that do not have a highest ToS duration for the Cell ID are removed. In some embodiments, logged cell reselections are edited such that cell reselections having a ToS duration lower than a threshold value are removed. In some embodiments, logged selections are edited based on whether they are included in a ping-pong handover sequence.

As discussed above, identifying one or more ping-pong handovers includes identifying a first logged cell reselection for a first Cell ID, identifying a second (i.e., middle) logged cell reselection for a second Cell ID comprising a ToS duration lower than the threshold value, and identifying a third (i.e., duplicate) logged cell reselection for the first Cell ID. An example of a ping-pong sequence is shown as sequence 320 of FIG. 3. Embodiments may edit this sequence by removing the above described second (i.e., middle) logged cell reselection of each identified ping-pong handover from the mobility report. In some embodiments, the third (i.e., duplicate) logged cell reselection for the first Cell ID is removed; in other embodiments, a single entry for the first Cell ID is created that includes the ToS duration of the third (i.e., duplicate) logged cell reselection added to the ToS duration of the first logged cell reselection; in other embodiments, the logged cell reselection having the largest ToS duration value is kept.

In other embodiments, logged cell reselections may be edited regardless of whether the number of logged cell reselections has exceeded a threshold value. In other words, logged cell reselections for duplicate Cell IDs, logged cell reselections having a short ToS duration value, and/or cell reselections of a ping-pong handover may be edited and/or removed for any reason.

Whether the logged cell reselections have exceeded the threshold limit, an operation is executed to determine if the UE is transitioning from the RRC_IDLE state to an RRC_CONNECTED state (shown as block 708). If so, then an operation is executed to transmit the (edited) logged cell reselections to an E-UTRAN communicatively coupled to the UE (shown as block 710) if it receives a request from the eNB; otherwise, logging cell reselections during the RRC_IDLE is continued (shown as block 702).

Figure 8:
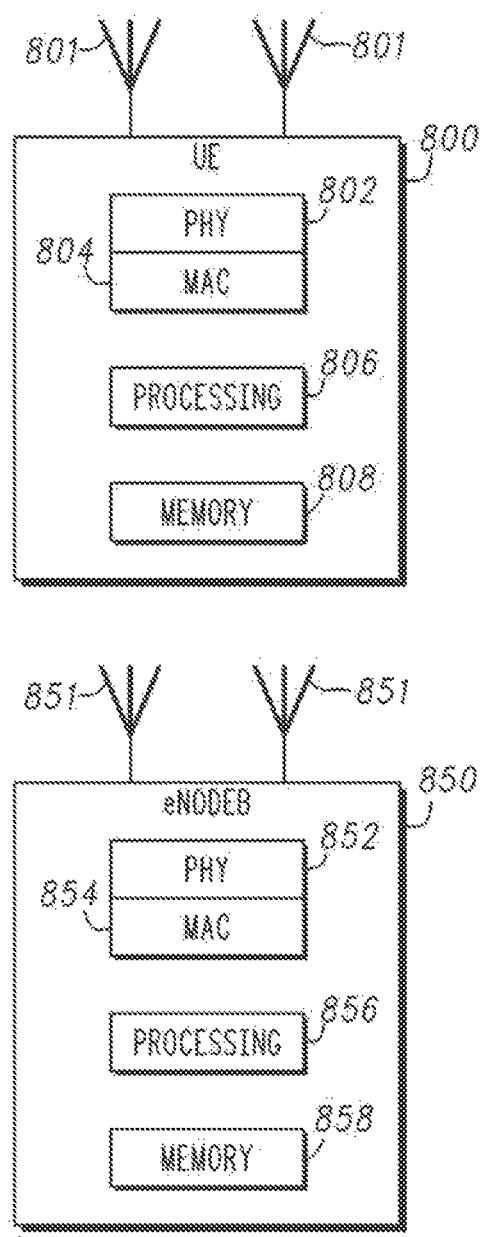
FIG. 8 shows a block diagram of a UE and an Evolved Node B (eNodeB), in accordance with some embodiments.

FIG. 8 shows a block diagram of a UE 800 and an eNodeB 850, in accordance with some embodiments. It should be noted that in some embodiments, the eNodeB 850 can be a stationary non-mobile device. The UE 800 can include physical layer circuitry 802 for transmitting and receiving signals to and from the eNodeB 850, other eNodeBs, other UEs, or other devices using one or more antennas 801, while the eNodeB 850 can include physical layer circuitry 852 for transmitting and receiving signals to and from the UE 800, other eNodeBs, other UEs, or other devices using one or more antennas 851. The UE 800 can also include medium access control layer (MAC) circuitry 804 for controlling access to the wireless medium, while the eNodeB 850 can also include MAC circuitry 854 for controlling access to the wireless medium. The UE 800 can also include processing circuitry 806 and memory 808 arranged to perform the operations described herein, and the eNodeB 850 can also include processing circuitry 856 and memory 858 arranged to perform the operations described herein.

The antennas 801, 851 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 801, 851 can be effectively separated to benefit from spatial diversity and the different channel characteristics that can result.

Although the UE 800 and eNodeB 850 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and circuitry for performing at least the functions described herein. In some embodiments, the functional elements can refer to one or more processes operating on one or more processing elements.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors and can be configured with instructions stored on a computer-readable storage device.

In accordance with embodiments, the UE 800 can operate in accordance with a D2D communication mode. The UE 800 can include hardware processing circuitry 806 configured to determine a synchronization reference time based on reception of one or more signals from the eNodeB 850. The hardware processing circuitry 806 can be further configured to, during a D2D communication session, transmit Multi-Time Transmission Interval Bundle Groups (MTBG) of data symbols during a first group of data transmission intervals (DTI) and refrain from transmission of data symbols during a second group of DTIs that is exclusive to the first group of DTIs. Starting times of the DTIs can be based at least partly on the synchronization reference time. The hardware processing circuitry 806 can be further configured to transmit, during an in-network communication session exclusive to the D2D communication session, data symbols according to a time transmission interval (TTI) reference time that is synchronized to the synchronization reference time. These embodiments are described in more detail below.

In some scenarios, the UE 800, operating in a cellular communication network, can begin to experience performance degradation for various reasons. As an example, user loading or throughput demands of the network can become high. As another example, the UE 800 can move toward or beyond the edges of coverage cells. While operating in the network, the UE 800 can actually be in communication with other UEs that are physically located in close proximity to the UE 800, although the communication can take place through the network. In addition to, or instead of, communication through the network, it can be beneficial to the UE 800 and the system for the UE 800 to engage in direct or D2D communication with one or more other UEs that can be within range of the UE 800. As an example, in the performance degradation scenarios described above, the D2D communication between the UE 800 and the other UEs can enable the network to off-load some of the network traffic, which can improve overall system performance.

Figure 9:
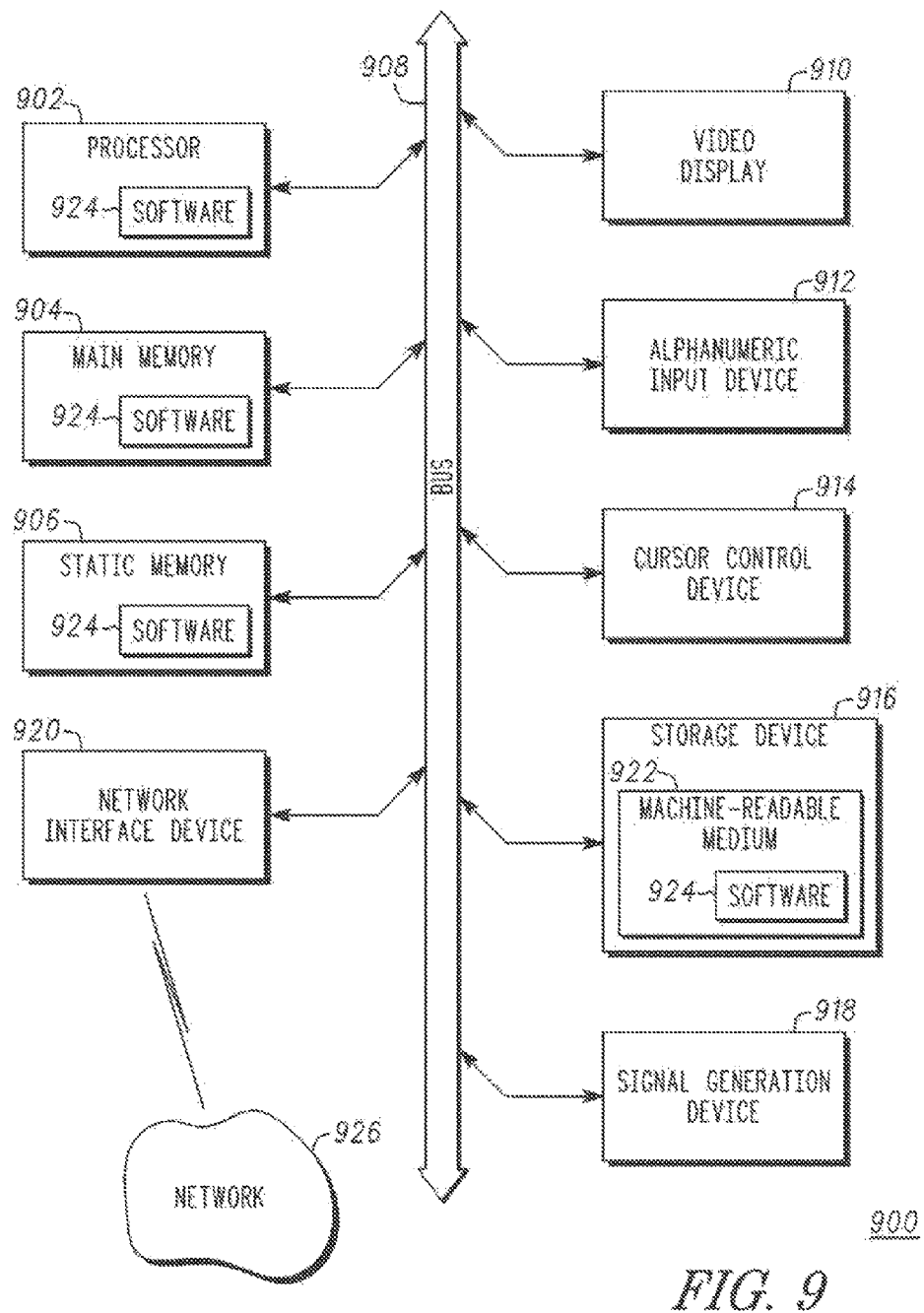
FIG. 9 is a block diagram illustrating components of a machine, according to some example embodiments, able to read instructions from a machine-readable medium and perform any one or more of the methodologies discussed herein, according to aspects of the disclosure.

FIG. 9 is a block diagram illustrating components of a machine, according to some example embodiments, able to read instructions from a machine-readable medium and perform any one or more of the methodologies discussed herein, according to aspects of the disclosure. In particular, FIG. 9 illustrates an exemplary computer system 900 within which software 924 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 900 can function as any of the above described UEs or eNodeBs, and can be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 can further include a video display unit 910 (e.g., a LCD or a cathode ray tube (CRT)). The computer system 900 also includes an alphanumeric input device 912 (e.g., a keyboard), a user interface navigation (or cursor control) device 914 (e.g., a mouse), a storage device 916, a signal generation device 918 (e.g., a speaker), and a network interface device 920.

The storage device 916 includes a non-transitory machine-readable medium 922 on which is stored one or more sets of data structures and software 924 embodying or utilized by any one or more of the methodologies or functions described herein. The software 924 can also reside, completely or at least partially, within the main memory 904 and/or within the processor 902 during execution thereof by the computer system 900, with the main memory 904 and the processor 902 also constituting non-transitory, machine-readable media 922. The software 924 can also reside, completely or at least partially, within the static memory 906.

While the non-transitory machine-readable medium 922 is shown in an example embodiment to be a single medium, the term "machine-readable medium" can include a single medium or multiple media (e.g., a centralized or distributed database, and/or associated caches and servers) that store the one or more software 924 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media 922 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The software 924 can further be transmitted or received over a communications network 926 using a transmission medium. The software 924 can be transmitted using the network interface device 920 and any one of a number of well-known transfer protocols (e.g., HyperText Transfer Protocol (HTTP)). Examples of communication networks include a local area network (LAN), a wide area network (WAN), the internet, mobile telephone networks, plain old telephone service (POTS) networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software 924.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Some embodiments describe user equipment (UE) comprising circuitry configured to, during a radio resource control idle (RRC_IDLE) state, log a plurality of cell reselections in a mobility report, each logged cell reselection to include a cell identification (Cell ID) and a Time of Stay (ToS) duration, edit the mobility report to remove one or more logged cell reselections based, at least in part, on identified logged cell reselections having duplicate Cell IDs and/or identified logged cell reselections having a ToS duration lower than a threshold value, and transmit the edited mobility report to an evolved Universal Terrestrial Radio Access Network (E-UTRAN) in response to a transition from the RRC_IDLE state.

In some embodiments, the transition from the RRC_IDLE state comprises a transition to a radio resource control connected (RRC_CONNECTED) state. In some embodiments, the circuitry is further configured to, for each of the duplicate Cell IDs, remove logged cell reselections for a Cell ID that do not have a highest ToS duration for the Cell ID from the mobility report.

In some embodiments, the circuitry is further configured to remove logged cell reselections having a ToS duration lower than a threshold value from the mobility report. In some embodiments, the circuitry is to edit the mobility report to remove one or more logged cell reselections based on identified logged cell reselections having duplicate Cell IDs and identified logged cell reselections having a ToS duration lower than a threshold value, and the circuitry is further configured to identify ping-pong handovers having a sequence of logged cell reselections comprising a first logged cell reselection for a first Cell ID, a second logged cell reselection for a second Cell ID comprising a ToS duration lower than the threshold value, and a third logged cell reselection for the first Cell ID; the circuitry also is configured to remove the second logged cell reselection of each identified ping-pong handover from the mobility report. In some embodiments, the circuitry is further configured to remove the third logged cell reselection of each identified ping-pong handover from the mobility report. In some embodiments, the circuitry is further configured to edit the first logged cell reselection of each identified ping-pong handover by adding the ToS duration of the third logged cell reselection of the respective ping-pong handover to the ToS duration of the first logged cell reselection.

In some embodiments, the circuitry is to edit the mobility report to remove one or more logged cell reselections in response to the plurality of cell reselections for the UE exceeding a threshold limit value. In some embodiments, the threshold limit value comprises sixteen logged cell reselections.

In some embodiments, the mobility report is included in a radio resource control (RRC) message and is to be transmitted via a random access channel (RACH). In some embodiments, the UE further comprises one or more antennas to transmit the edited mobility report to the E-UTRAN. In some embodiments, the one or more antennas are to transmit the edited mobility report to an enhanced Node-B (eNodeB) of the E-UTRAN.

Some embodiments describe a non-transitory computer-readable storage medium that stores instructions for execution by one or more processors of user equipment (UE) to perform operations to configure the UE to, during a radio resource control idle (RRC_IDLE) state, log a plurality of cell reselections in a mobility report, each logged cell reselection to include a cell identification (Cell ID) and a Time of Stay (ToS) duration, in response to the plurality of cell reselections for the UE exceeding a threshold limit value, edit the mobility report to remove one or more logged cell reselections based, at least in part, on an identification of logged cell reselections having duplicate Cell IDs and/or logged cell reselections having a ToS duration lower than a threshold value, and transmit the edited mobility report to an evolved Universal Terrestrial Radio Access Network (E-UTRAN) in response to the UE transitioning from the RRC_IDLE state to a radio resource control connected (RRC_CONNECTED) state.

In some embodiments, the operations further configure the one or more processors of the UE to, for each of the duplicate Cell IDs, remove logged cell reselections for a Cell ID that do not have a highest ToS duration for the Cell ID from the mobility report. In some embodiments, the operations further configure the one or more processors of the UE to remove logged cell reselections having a ToS duration lower than a threshold value from the mobility report. In some embodiments, the operation to configure the UE to edit the mobility report to remove one or more logged cell reselections is based on an identification of logged cell reselections having duplicate Cell IDs and an identification of logged cell reselections having a ToS duration lower than a threshold value, and operations further configure the UE to identify one or more ping-pong handovers by identifying a sequence of logged cell reselections comprising a first logged cell reselection for a first Cell ID, a second logged cell reselection for a second Cell ID comprising a ToS duration lower than the threshold value, and a third logged cell reselection for the first Cell ID; the operations further configure the UE to remove the second logged cell reselection of each identified ping-pong handover from the mobility report. In some embodiments, the operations further configure the one or more processors of the UE to remove the third logged cell reselection from the mobility report. In some embodiments, the operations further configure the one or more processors of the UE to edit the first logged cell reselection of each identified ping-pong handover by adding the ToS duration of the third logged cell reselection of the respective ping-pong handover to the ToS duration of the first logged cell reselection.

Some embodiments describe a method performed by user equipment (UE) comprising editing a mobility report comprising a plurality of logged cell reselections by removing at least one logged cell reselection, wherein each logged cell reselection includes a cell identification (Cell ID) and a Time of Stay (ToS) duration, and the at least one logged cell reselection is selected to be removed based, at least in part, on identifying one or more logged cell reselections having duplicate Cell IDs and/or identifying one or more logged cell reselections having a ToS duration lower than a threshold value, detecting packet data to be transmitted or received during a radio resource control idle (RRC_IDLE) state, transitioning from the RRC_IDLE state to a radio resource control connected (RRC_CONNECTED) state in response to detecting packet data to be transmitted or received, and transmitting the edited mobility report in response to transitioning from the RRC_IDLE to the RRC_CONNECTED state.

In some embodiments, removing the at least one logged cell reselection is based on identifying logged cell reselections having duplicate Cell IDs and identifying logged cell reselections having a ToS duration lower than a threshold value, and the method further comprises identifying one or more ping-pong handovers by identifying a sequence of logged cell reselections comprising a first logged cell reselection for a first Cell ID, a second logged cell reselection for a second Cell ID comprising a ToS duration lower than the threshold value, and a third logged cell reselection for the first Cell ID; the method may further include removing the second logged cell reselection of each identified ping-pong handover from the mobility report. In some embodiments, the method further comprises removing the third logged cell reselection from the mobility report. In some embodiments, the method further comprises editing the first logged cell reselection of each identified ping-pong handover by adding the ToS duration of the third logged cell reselection of the respective ping-pong handover to the ToS duration of the first logged cell reselection.

What is claimed is:

1. A user equipment (UE) comprising:
   processing circuitry configured to:
      during a radio resource control idle (RRC_IDLE) state, log a plurality of cell reselections in a mobility report, each logged cell reselection to include a cell identification (Cell ID) and a Time of Stay (ToS) duration; and
      edit the mobility report to remove one or more logged cell reselections based, at least in part, on identified logged cell reselections having a ToS duration lower than a threshold value; and
   transceiver circuitry controlled by the processing circuitry and configured to:
      transmit the edited mobility report to an evolved Universal Terrestrial Radio Access Network (E-UTRAN) in response to a transition from the RRC_IDLE state.

2. The UE of claim 1, wherein the transition from the RRC_IDLE state comprises a transition to a radio resource control connected (RRC_CONNECTED) state.

3. The UE of claim 1, wherein the circuitry is further configured to:
   for each of the duplicate Cell IDs, remove logged cell reselections for a Cell ID that do not have a highest ToS duration for the Cell ID from the mobility report.

4. The UE of claim 1, wherein the circuitry is to edit the mobility report to remove one or more logged cell reselections based on identified logged cell reselections having duplicate Cell IDs and identified logged cell reselections having a ToS duration lower than a threshold value, and the circuitry is further configured to:
   identify ping-pong handovers having a sequence of logged cell reselections comprising:
      a first logged cell reselection for a first Cell ID;
      a second logged cell reselection for a second Cell ID comprising a ToS duration lower than the threshold value; and
      a third logged cell reselection for the first Cell ID; and
   remove the second logged cell reselection of each identified ping-pong handover from the mobility report.

5. The UE of claim 4, wherein the circuitry is further configured to:
   remove the third logged cell reselection of each identified ping-pong handover from the mobility report.

6. The UE of claim 5, wherein the circuitry is further configured to:
   edit the first logged cell reselection of each identified ping-pong handover by adding the ToS duration of the third logged cell reselection of the respective ping-pong handover to the ToS duration of the first logged cell reselection.

7. The UE of claim 1, wherein the circuitry is to edit the mobility report to remove one or more logged cell reselections in response to the plurality of cell reselections for the UE exceeding a threshold limit value.

8. The UE of claim 7, wherein the threshold limit value comprises sixteen logged cell reselections.

9. The UE of claim 1, wherein the mobility report is included in a radio resource control (RRC) message and is to be transmitted via a random access channel (RACH).

10. The UE of claim 1, wherein the UE further comprises one or more antennas to transmit the edited mobility report to the E-UTRAN.

11. The UE of claim 10, wherein the one or more antennas are to transmit the edited mobility report to an enhanced Node-B (eNodeB) of the E-UTRAN.

12. A non-transitory computer-readable storage medium that stores instructions for execution by one or more processors of user equipment (UE) to perform operations to configure the UE to:
   during a radio resource control idle (RRC_IDLE) state, log a plurality of cell reselections in a mobility report, each logged cell reselection to include a cell identification (Cell ID) and a Time of Stay (ToS) duration;
   in response to the plurality of cell reselections for the UE exceeding a threshold limit value, edit the mobility report to remove one or more logged cell reselections based, at least in part, on an identification of logged cell reselections having a ToS duration lower than a threshold value; and
   transmit the edited mobility report to an evolved Universal Terrestrial Radio Access Network (E-UTRAN) in response to the UE transitioning from the RRC_IDLE state to a radio resource control connected (RRC_CONNECTED) state.

13. The non-transitory computer-readable storage medium of claim 12, wherein the operations further configure the one or more processors of the UE to:
   for each of the duplicate Cell IDs, remove logged cell reselections for a Cell ID that do not have a highest ToS duration for the Cell ID from the mobility report.

14. The non-transitory computer-readable storage medium of claim 12, wherein the operations further configure the one or more processors of the UE to:
   remove logged cell reselections having a ToS duration lower than a threshold value from the mobility report.

15. The non-transitory computer-readable storage medium of claim 14, wherein the operation to configure the UE to edit the mobility report to remove one or more logged cell reselections is based on an identification of logged cell reselections having duplicate Cell IDs and an identification of logged cell reselections having a ToS duration lower than a threshold value, and operations further configure the UE to:
   identify one or more ping-pong handovers by identifying a sequence of logged cell reselections comprising:
      a first logged cell reselection for a first Cell ID;
      a second logged cell reselection for a second Cell ID comprising a ToS duration lower than the threshold value; and
      a third logged cell reselection for the first Cell ID; and
   remove the second logged cell reselection of each identified ping-pong handover from the mobility report.

16. The non-transitory computer-readable storage medium of claim 15, wherein the operations further configure the one or more processors of the UE to:
   remove the third logged cell reselection from the mobility report.

17. The non-transitory computer-readable storage medium of claim 16, wherein the operations further configure the one or more processors of the UE to:

edit the first logged cell reselection of each identified ping-pong handover by adding the ToS duration of the third logged cell reselection of the respective ping-pong handover to the ToS duration of the first logged cell reselection.

18. A method performed by user equipment (UE) comprising:

editing a mobility report comprising a plurality of logged cell reselections by removing at least one logged cell reselection, wherein each logged cell reselection includes a cell identification (Cell ID) and a lime of Stay (ToS) duration, and the at least one logged cell reselection is selected to be removed based, at least in part, on identifying one or more logged cell reselections having a ToS duration lower than a threshold value;

detecting packet data to be transmitted or received during a radio resource control idle (RRC_IDLE) state;

transitioning from the RRC_IDLE state to a radio resource control connected (RRC_CONNECTED) state in response to detecting packet data to be transmitted or received; and transmitting the edited mobility report in response to transitioning from the RRC_IDLE to the RRC_CONNECTED state.

19. The method of claim 18, wherein removing the at least one logged cell reselection is based on identifying logged cell reselections having duplicate Cell IDs and identifying logged cell reselections having a ToS duration lower than a threshold value, and the method further comprises: identifying one or more ping-pong handovers by identifying a sequence of logged cell reselections comprising: a first logged cell reselection for a first Cell ID; a second logged cell reselection for a second Cell ID comprising a ToS duration lower than the threshold value; and a third logged cell reselection for the first Cell ID; and removing the second logged cell reselection of each identified ping-pong handover from the mobility report.

20. The method of claim 19, further comprising:

removing the third logged cell reselection from the mobility report.

21. The method of claim 20, further comprising:

editing the first logged cell reselection of each identified ping-pong handover by adding the ToS duration of the third logged cell reselection of the respective ping-pong handover to the ToS duration of the first logged cell reselection.

* * * * *

UNITED STATES PATENT AND TRADEMARK OFFICE
CERTIFICATE OF CORRECTION

PATENT NO.         : 9,913,180 B2
APPLICATION NO.    : 14/569295
DATED              : March 6, 2018
INVENTOR(S)        : Candy Yiu It is certified that error appears in the above-identified patent and that said Letters Patent is hereby corrected as shown below:

In Column 17, Line 14, in Claim 18, delete "lime" and insert --Time-- therefor

Signed and Sealed this
Twenty-eighth Day of May, 2019

Andrei Iancu
*Director of the United States Patent and Trademark Office*